(12) United States Patent
Hopf et al.

(10) Patent No.: US 6,507,542 B1
(45) Date of Patent: Jan. 14, 2003

(54) CHANGER APPARATUS FOR INFORMATION DISCS

(75) Inventors: Christian Hopf, Wetzlar; Norbert Kunze, Diez; Stefan Müller, Wetzlar; Horst Rumpf, Herborn; Cornelius Wouters, Asslar, all of (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/464,001

(22) Filed: Dec. 15, 1999

(30) Foreign Application Priority Data

Dec. 22, 1998 (DE) .......................................... 198 59 493

(51) Int. Cl.⁷ .............................................. G11B 17/22
(52) U.S. Cl. ................................ 369/30.85; 369/30.78; 369/30.82
(58) Field of Search ............................... 369/178, 179, 369/181, 36.01, 30.7, 192, 34.01, 38.01, 30.85, 30.78, 30.82; 360/98.01, 98.02, 98.03, 98.04, 98.05, 98.06, 98.07, 98.08

(56) References Cited

U.S. PATENT DOCUMENTS

| | | | |
|---|---|---|---|
| 5,123,001 A | * 6/1992 | Nakamichi et al. | 369/36 |
| 5,682,364 A | * 10/1997 | Ogawa | 369/36 |
| 5,862,109 A | * 1/1999 | Nakamichi | 369/36 |
| 5,870,358 A | * 2/1999 | Kim et al. | 369/36 |
| 5,872,748 A | * 2/1999 | Shindo et al. | 369/38 |
| 6,301,205 B1 | * 10/2001 | Nakamichi | 369/192 |

FOREIGN PATENT DOCUMENTS

| | | | |
|---|---|---|---|
| EP | 0742558 A2 | | 11/1996 |
| EP | 0884726 A1 | | 12/1998 |
| EP | 0944070 A1 | * | 9/1999 |
| JP | 6-131793 | * | 5/1994 |
| JP | 10-40619 | * | 2/1998 |
| JP | 2000-298914 | * | 10/2000 |
| JP | 2000-331408 | * | 11/2000 |
| JP | 2001-35060 | * | 2/2001 |
| JP | 2001-52409 | * | 2/2001 |

* cited by examiner

Primary Examiner—Brian E. Miller
Assistant Examiner—Chen Tianjie

(57) ABSTRACT

A changer apparatus for information discs includes a stacking unit for stacking at least two information discs in at least two stacking positions, the stacking unit having holding trays for holding the information discs in holding planes and a first transport mechanism for moving the holding trays into the stacking positions. The holding trays each have a top part and a bottom part, the top parts and the bottom parts of the holding trays are jointly movable in the same direction by means of the first transport mechanism for the transport of the information disc inside the stacking unit, and the top part and the bottom part, of the holding tray holding the information disc to be read and/or inscribed, are movable with respect to one another by means of the first transport mechanism in order to bring this information disc into a play position intended for reading and/or inscribing it, in such a manner that a clearance is obtained between the information disc and the top part and/or between the information disc and the bottom part.

8 Claims, 7 Drawing Sheets

CHANGER APPARATUS FOR INFORMATION DISCS

FIELD OF THE INVENTION

The invention relates to the field of accessing stacked information discs.

BACKGROUND OF THE INVENTION

The invention relates to a changer apparatus for information discs, including a read/write unit for reading information stored on an information disc and/or writing information onto an information disc and including a stacking unit for stacking at least two information discs in at least two stacking positions, the stacking unit having holding trays for holding the information discs in holding planes and a first transport mechanism for moving the holding trays into the stacking positions.

Such a changer apparatus is known from EP 884 726. In this known apparatus a loading position has been provided inside the stacking unit, in which position one of the holding trays can be brought by rotation of a spindle. In order to bring the information disc into a play position in which it is to be played back, the known apparatus has a transport mechanism by means of which an information disc to be played is movable from holding tray, which is in the loading position, into the play position, the play position being situated outside the stacking unit. For such a play position situated outside the stacking unit a suitable mounting space must be provided in the construction of the known apparatus.

It is an object of the invention to provide an apparatus of the type defined in the opening paragraph, which in particular enables a space-saving construction to be realized.

According to the invention, this object is achieved in that the holding trays each have two parts, i.e. a top part and a bottom part, the top parts and the bottom parts of the holding trays are jointly movable in the same direction by means of the first transport mechanism for the transport of the information disc inside the stacking unit, and the top part and the bottom part of the holding tray holding an information disc to be read and/or inscribed are movable with respect to one another by means of the first transport mechanism in order to bring this information disc into a play position intended for reading and/or inscribing it.

Information discs are to be understood to mean in particular optically readable information carriers such as CDs (Compact Discs) and DVDs (Digital Versatile Discs). In accordance with the invention the holding trays include two parts that can be moved together in the same direction and also relative to one another, in particular, in opposite directions. When the top parts and the bottom parts of the holding trays are moved together in the same direction, the information discs held therein are conveyed by the top parts and the bottom parts of the holding trays and can thus be transported inside the stacking unit. This does not involve any relative movement between the top parts and the bottom parts, i.e. the distance between the top parts and the bottom parts does not change. In order to play an information disc the top part and the bottom part of the holding tray which holds this information disc can be moved relative to one another. This means that the distance between the top part and the bottom part is increased. Suitably, the top part and the bottom part of the holding tray which holds the information disc to be played are moved in opposite directions, i.e. the top part in an upward direction and the bottom part in a downward direction. The clearance thus formed between the information disc and the top part and/or between the information disc and the bottom part allows the information disc to be played inside the stacking unit. Preferably, this is effected in that the read/write unit is moved into the stacking unit and reads the information stored on the information disc or writes information onto the information disc. Moving the information disc into a play position outside the stacking unit is not necessary and, consequently, no transport mechanism is needed for this purpose. Playing the information disc directly inside the stacking unit thus makes it possible to obtain a very compact apparatus of small dimensions. This is particularly advantageous for apparatuses intended for use in motorcars.

Preferably, the first transport mechanism is adapted to move the holding trays along a stacking line which is oriented transversely, in particular perpendicularly, to the holding planes. This of the invention defined in claim 2 enables a particularly compact and space-saving construction to be obtained.

Preferably, the play position is situated on the stacking line and a second transport mechanism has been provided for moving the read/write unit from a standby position into the play position. This of the invention defined in claim 3 has the advantage that the information disc to be played can remain in the stacking unit and that no separate transport mechanism is necessary for the transport of the information disc out of the stacking unit into the play position.

The second transport mechanism moves the read/write unit from a standby position, which is preferably situated outside the stacking unit, into the play position. The second transport mechanism can be realized for example in that the read/write unit is pivotably supported on a pivotal arm and is pivoted from the standby position into the play position. Alternatively, it is possible for example to mount the read/write unit on the chassis housing of the changer apparatus so as to be translatable and to realize the transfer from the standby position into the play position by means of a translatory movement.

The read/write unit usually has a rotatable turntable onto which the information disc to be played is pressed, clamped or placed in another manner. Preferably information disc to be played is positioned onto the turntable by means of the first transport mechanism. To this end, the read/write unit is first moved into the stacking unit and the turntable is centered with respect to the stacking line. Subsequently, the information disc to be played is pressed or clamped onto the turntable along the stacking line by means of the first transport mechanism, i.e. carried by the associated holding tray.

Preferably, however, the read/write unit itself is adapted to press or clamp the information disc onto the turntable. This can be achieved for example in that the read/write unit is first moved from the standby position into the stacking unit and is then pressed, for example from below, against the information disc to be played, which is held in the holding tray. Alternatively, other clamping mechanisms can be realized.

Preferably, the apparatus has an eject position in which the information disc can be removed from the apparatus and a third transport mechanism has been provided for moving the information disc from the holding tray, which is in a loading position of the stacking unit, into the eject position, the loading position being situated on the stacking line. This has the advantage that the information disc can be loaded separately into the changer apparatus and can also be removed separately from the changer apparatus. This is particularly advantageous in the case that the changer apparatus is mounted in the dashboard of a motorcar. In order to move an information disc from the stacking unit into the eject position this information disc is first transferred to the loading position of the stacking unit by means of the first transport mechanism, carried by the associated holding tray. By means of the third transport mechanism this information disc is then removed from the holding tray, which is in the loading position, and is brought to the eject position. The third transport mechanism can be realized for example by means of grooved transport wheels arranged on pivotal arms, as described in EP 742558.

In the advantageous embodiment of the invention defined in claim 7, the eject position is laterally offset with respect to the stacking line, i.e. in order to be ejected, the information disk must be removed from the holding tray which is in the loading position, and must be moved into the eject position which is situated outside the stacking unit. Preferably, the third transport mechanism is used for this. This is particularly simple and cheap. However, alternatively the second transport mechanism provided for the transport of the read/write unit can effect the transport of the information disk from the loading position into the eject position.

Preferably, the play position is laterally offset with respect to the stacking line and;

Preferably, the top parts and the bottom parts of the holding trays are coupled to spindles having at least one screw thread, the top parts and the bottom parts of the holding trays are movable by rotation of the spindles, the spindles have at least two sections with a first spindle section and a second spindle section, the first spindle section and the second spindle section are rotatable in one common direction for moving the information discs inside the stacking unit, and the first spindle section and the second spindle section are rotatable with respect to one another for moving the information disc into the play position, the first spindle section being adapted to move the top part and the second spindle section being adapted to move the bottom part of the holding tray which holds this information disc. This provides a simple construction for realizing the first transport mechanism. Preferably, three spindles having an external screwthread and arranged in a triangle are provided. The external screwthread engages with elements of the holding trays, as a result of which a rotation of the spindles causes the holding trays to be moved inside the stacking unit. When the first and the second spindle section are rotated together the first and the second spindle section are preferably interlocked, as a result of which there is no relative movement between the first and the second spindle section. The interlock between the first and the second spindle section is then implemented so as to obtain a continuous screwthread between the first spindle section and the second spindle section. The rotation of the first and the second spindle section relative to one another can be realized in that the first and the second spindle section are rotated in opposite directions. Alternatively, it is possible that only the first or only the second spindle section is rotated, the second or the first spindle section being stationary.

Preferably, the spindle has a separating plane which divides the first spindle section and the second spindle section, the respective holding tray is movable into the separating plane by rotation of the first spindle section and the second spindle section in the same direction in order to move the information disc into the play position in a first step, and the top part and the bottom part of the holding tray are movable relative to one another by rotation of the first spindle section and the second spindle section relative to one another in a second step. This provides is of a particularly simple construction. Thus an information disc to be played, together with the holding tray carrying it, is first moved into the separating plane. The separating plane divides the first and the second spindle section. For the rotation of the first and the second spindle section in the same direction the first and the second spindle section are coupled to one another, in particular interlocked, in the area of the separating plane. For a rotation of the first and the second spindle section in opposite directions or relative to one another the coupling between the first and the second spindle section in the separating plane is released, i.e. the first and the second spindle section can be moved relative to one another. When the holding tray is situated in the separating plane the top part is coupled to the first spindle section and the bottom part is coupled to the second spindle section. When the first and the second spindle section are now rotated in opposite directions, the first spindle section acts upon the top part of the holding tray and moves this part upward. At the same time the oppositely rotating second spindle section acts upon the bottom part of the holding tray and moves this bottom part downward. As a result of this, a clearance is created between the information disc and the top part and the bottom part of the holding tray.

The changer apparatus in accordance with the invention is particularly suitable for mounting in a dashboard of a motor car because the mounting volume available there is very limited.

BRIEF DESCRIPTION OF THE DRAWING

Some embodiments of the invention, shown diagrammatically by way of example, will be described in more detail with reference to FIGS. 1 to 12 of the drawings. In the drawings.

DETAILED DESCRIPTION OF THE PREFERRED EMBODIMENT

Figure 1:
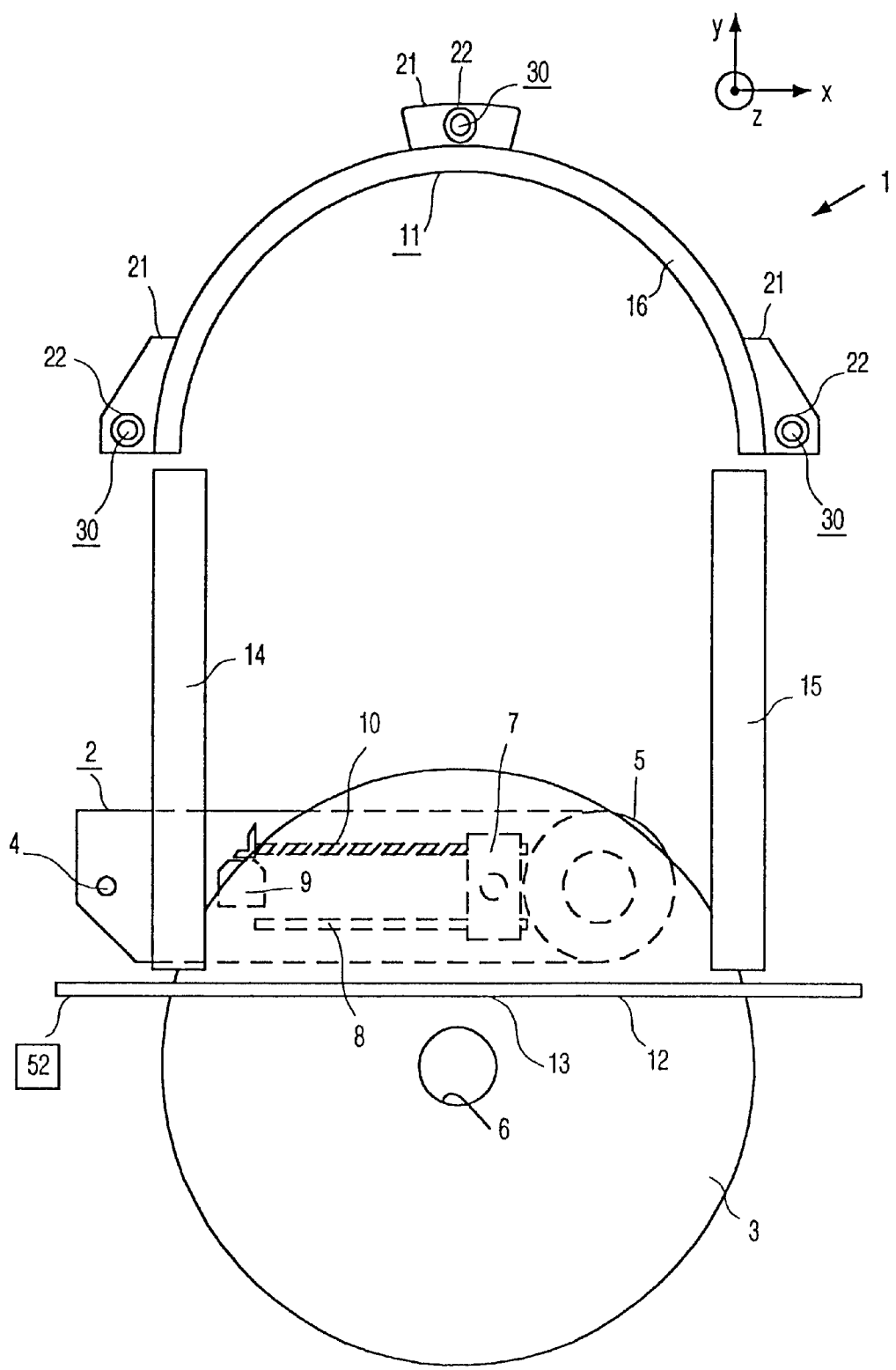
FIG. 1 is a plan view of a changer apparatus for information discs, showing a stacking unit, a read/write unit in a standby position, and an information disc in an eject position.

FIG. 1 is a plan view showing a changer apparatus 1 having a read/write unit 2 for reading information stored on an information disc 3 and for writing information onto the information disc 3. The read/write unit 2 is mounted so as to be pivotable about a pivotal axis 4 and includes a turntable 5 which is rotationally drivable by means of a drive mechanism, not shown, and which has apparatus for clamping the information disc 3. In order to pivot the read/write unit 2 a second transport mechanism 52, shown diagrammatically, has been provided. The information disc 3 has a central positioning hole 6 by means of which the information disc 3 can be pressed onto the turntable 5. The read/write unit 2 includes an optical scanning unit 7, which is translatable along a guide member 8 by means of a spindle motor 9 and a guide spindle 10. In order to stack a plurality of information discs in the changer apparatus 1 a stacking unit 11 has been provided. The information disc 3 in FIG. 1 is shown in an eject position, in which this information disc can be removed from the changer apparatus 1 and in which the information disc 3 can be loaded by hand into the changer apparatus 1 by a user. For this purpose, a front panel 12 of the changer apparatus 1 has a loading slot 13. For the transport of the information disc 3 from the eject position into the stacking unit 11 a left-hand transport element 14 and a right-hand transport element 15 have been provided to form third transport mechanism. The left-hand transport element 14 and the right-hand transport element 15 can be, for example, transport wheels mounted on pivotal arms and having grooves for engagement with the disc edge of the information disc 3. Such a transport mechanism is described in more detail in EP 742558. By the explicit reference to the transport mechanism described therein it is incorporated in the subject matter disclosed in the present Application. The stacking unit 11 is adapted to stack five information discs 3. For this purpose, the stacking unit 11 has five holding trays 16 to 20, of which only the uppermost holding tray 16 is visible in FIG. 1. For the transport of the holding trays 16 to 20 in a vertical direction z three spindles 30 have been provided to form a first transport mechanism, which spindles have external screwthreads, not visible in FIG. 1. The uppermost holding tray 16 has three flanges 21, which each have a hole 22 surrounding the respective spindles 30.

Figure 2:
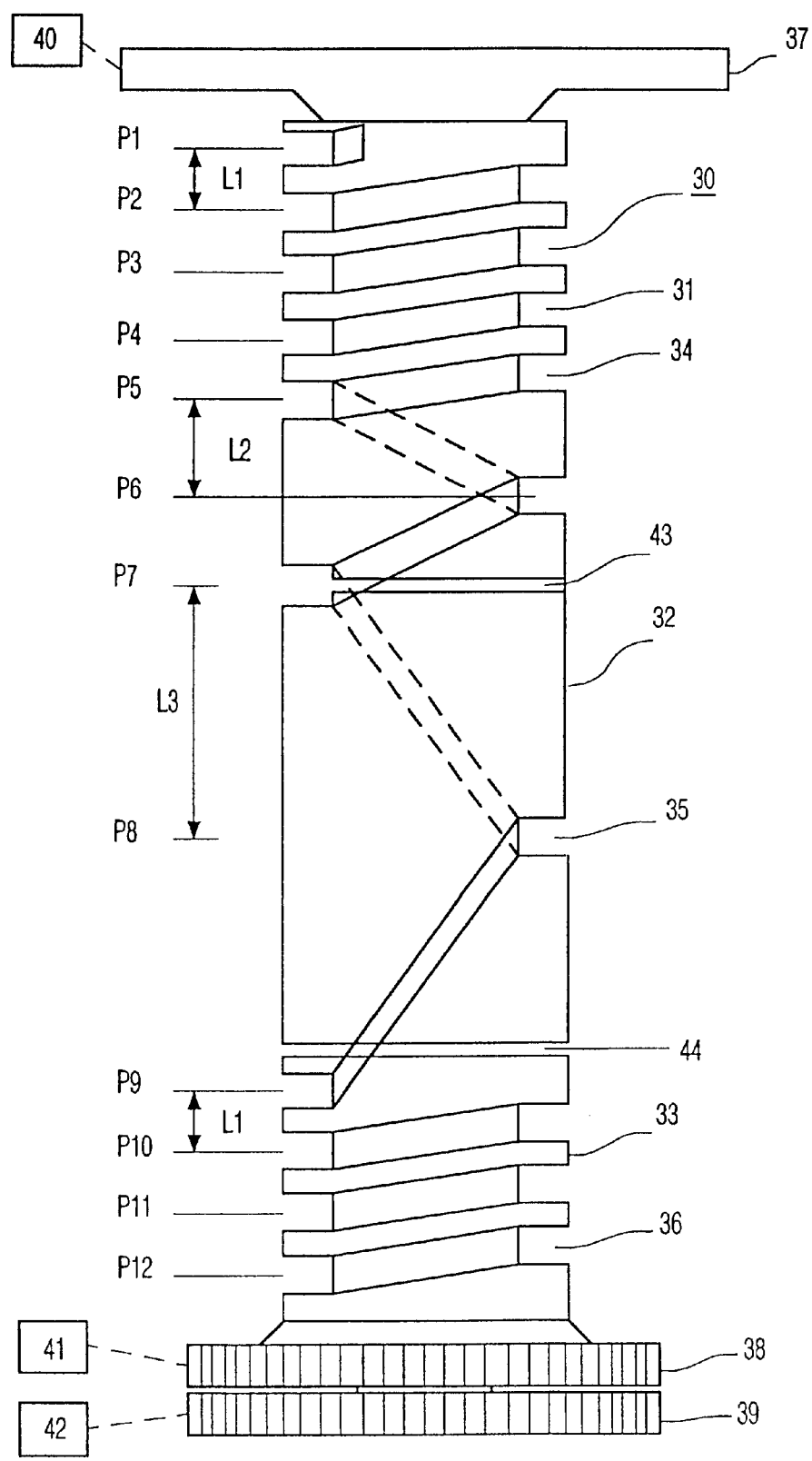
FIG. 2 is a side view of a spindle intended for the transport of holding trays, not shown, of the stacking unit, which spindle has three sections which are each rotatable by means of a transport mechanism.
Figure 3:
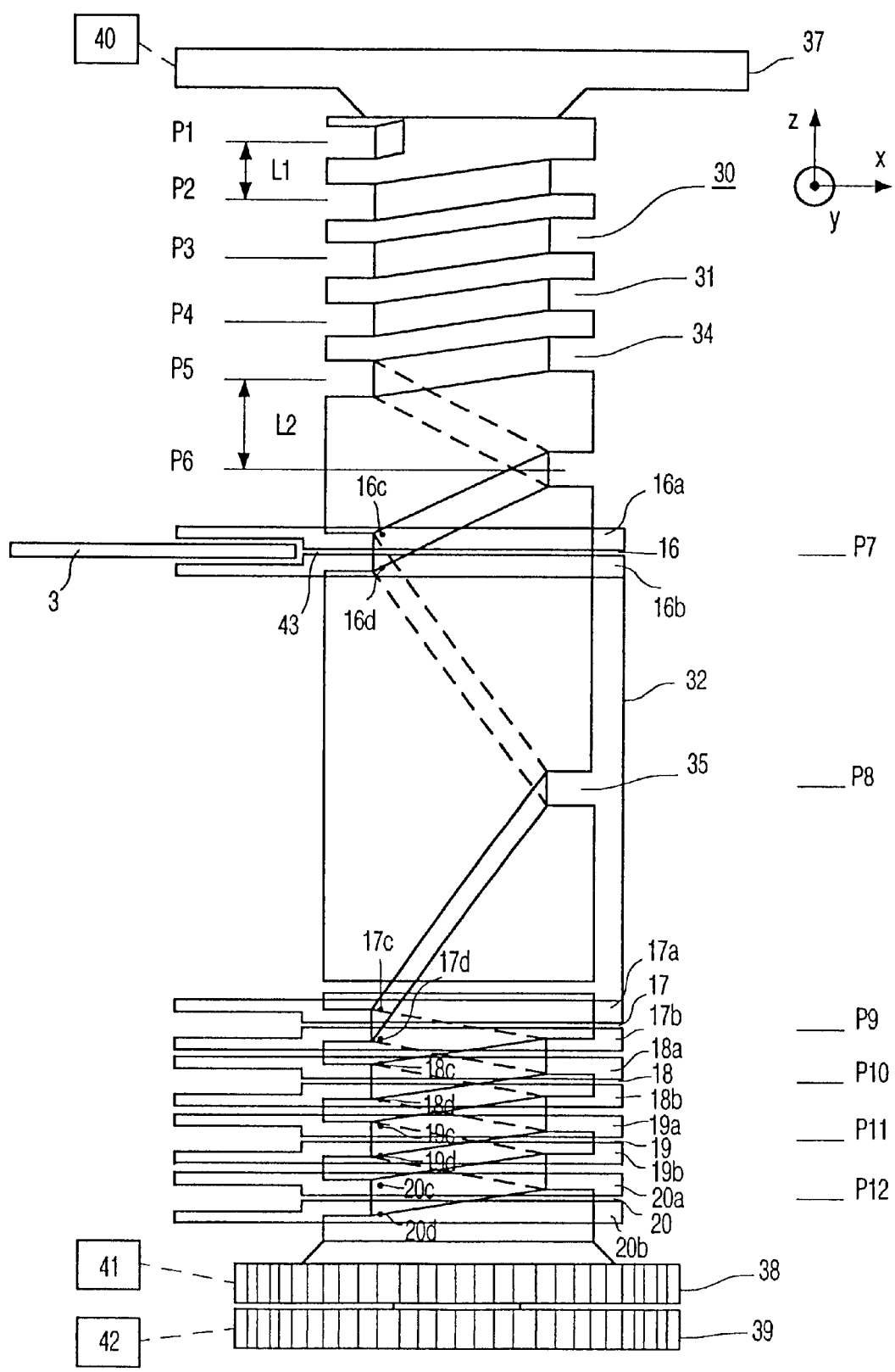
FIG. 3 is a side view of the spindle shown in FIG. 2, the spindle being coupled to five holding trays and one of the holding trays being disposed in a separating plane between the upper and the lower spindle section.

FIG. 2 is a side view showing the three spindles 30 of FIG. 1, the holding trays 16 to 20 not being shown. The spindles 30 have a first spindle section 31, a second spindle section 32 and a third spindle section 33. The first spindle section 31 has an external screwthread 34, the second spindle section 32 has an external screwthread 35, and the third spindle section 33 has an external screwthread 36. The first spindle section 31 is coupled to a first spur wheel 37, the second spindle section 32 is coupled to a second spur wheel 38, and the third spindle section 33 is coupled to a third spur wheel 39. The first spur wheel is rotationally drivable by means of a first drive mechanism 40, the second spur wheel is rotationally drivable by means of a second drive mechanism 41, and the third spur wheel 42 is rotationally drivable by means of a third drive mechanism 42. The first drive mechanism 40, the second rive mechanism 41 and the third drive mechanism 42 can be realized, for example, by means of conventional motors. The first drive mechanism 40, the second drive mechanism 41 and the third drive mechanism 42 are each intended for driving in two directions. The external screwthread 34 of the first spindle section 31 has a pitch L1 in an upper portion and a pitch L2 in a lower portion. The external screwthread 35 of the second spindle section 32 has a pitch L3, greater than the pitch L2 and greater than the pitch L1. The external screwthread 36 of the third spindle section 33 has a pitch L1 equal to the pitch L1 of the external screwthread 34 of the first spindle section 31. The first spindle section 31 is separated from the second spindle section 32 by a first separating plane 43 and the second spindle section 32 is separated from the third spindle section 33 by a second separating plane 44. By means of the first drive mechanism 40, the second drive mechanism 41 and the third drive mechanism 42 the first spindle section 31, the second spindle section 32 and the third spindle section 33 can be rotated jointly in the same direction and can also be rotated with respect to one another. A rotation of the spindle sections 31 to 33 with respect to one another can be achieved both in that the spindle sections are driven in opposite directions and in that one or two of the spindle sections 31 to 33 are stationary while one or two of the other spindle sections 31 to 33 is or are rotated. When the spindle sections are jointly rotated in one direction they are coupled to one another in such a manner that the external screwthreads 34 to 36 form one continuous external screwthread. This can be achieved by means of coupling mechanisms in the area of the first separating plane 43 and the second separating plane 44, by means of which the spindle sections 31 to 33 can coupled an uncoupled, for example in an interlocking manner. Alternatively or additionally, the first drive mechanism 40, the second drive mechanism 41 and the third drive mechanism 42 may be coupled so as to obtain a uniform rotation. By the rotation of the spindle sections 31 to 33 holding trays, not shown in FIG. 2 and coupled to the external screwthreads 34 to 36, can be moved into vertical positions P1 to P12. This will be illustrated by means of FIG. 3. FIG. 3 shows the spindles of FIG. 2 in a side view and in addition shows five holding trays 16 to 20 adapted to hold and store information discs. The holding tray 16 is in the position P7, the holding tray 17 is in the position P9, the holding tray 18 is in the position P10, the holding tray 19 is in the position P11 and the holding tray 20 is in the position P12. The holding trays 16 to 20 each comprise two parts and each have a top part 16a to 20a, respectively, and a bottom part 16b to 20b, respectively. The top parts 16a to 20a have drive elements 16c to 20c, shown diagrammatically, which engage in the external screwthreads 34 to 36 of the spindle sections 31 to 33. The bottom parts 16b to 20b have drive elements 16d to 20d, shown diagrammatically, which also engage in the external screwthreads 34 to 36 of the spindle sections 31 to 33. During rotation of the spindle sections 31 33 the drive elements 16c to 20c and 16d to 20d are guided and driven by the external screwthreads 34 to 36, as a result of which the top parts 16a to 20a and the bottom parts 16b to 20b are moved in or against the vertical direction z in accordance with the direction of rotation. In FIG. 3 the holding tray 16 in position P7 carries the information disc 3.

Figure 5:
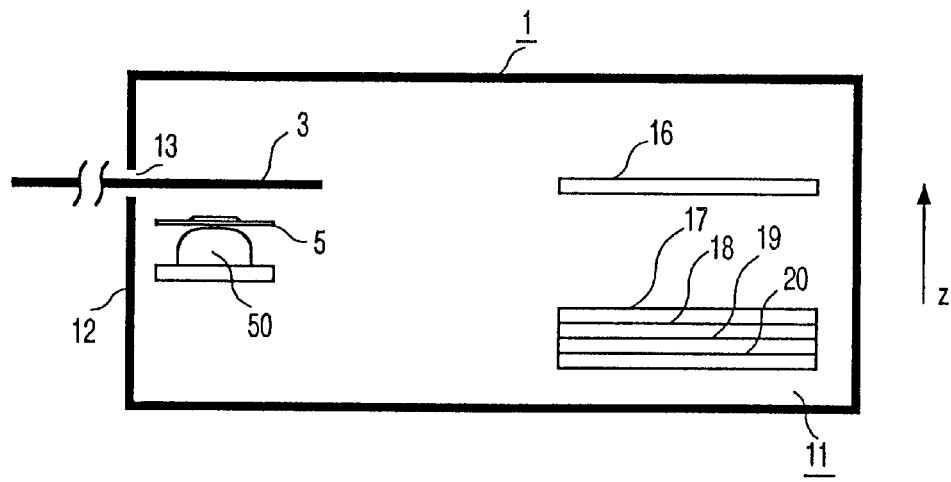
FIG. 5 is a side view of the changer apparatus shown in FIG. 1.

FIG. 5 shows the changer apparatus of FIG. 1 in a diagrammatical side view. The information disc 3 is in the eject position, in which it can be removed by hand by a user. The holding tray 16 is in a loading position 17, which corresponds to the position P6 in FIG. 3. The holding trays 17 to 20 are in the positions P9 to P12 in FIG. 3. The turntable 5 of the read/write unit 2, which is rotationally drivable by a turntable motor 50, is in a standby position.

Figure 6:
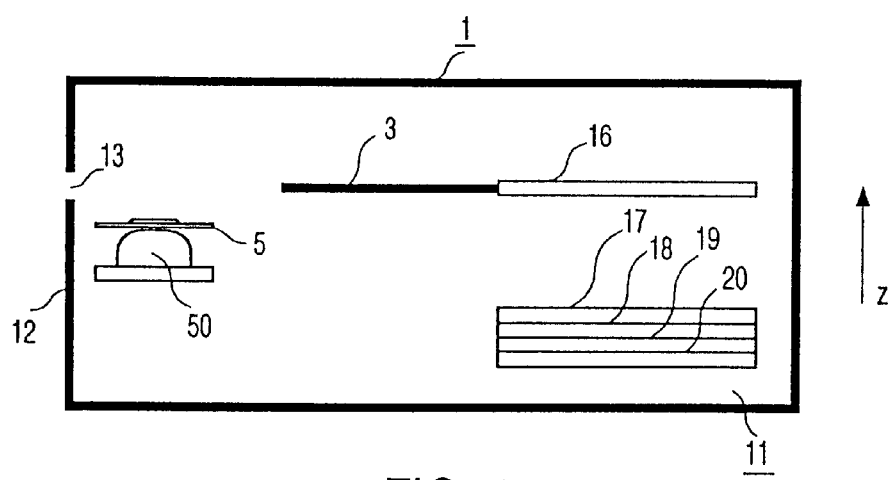
FIG. 6 is a side view of the changer apparatus as in FIG. 5, but with the information disc having been moved into the holding tray.

FIG. 6 shows the changer apparatus 5 after the information disc 3 has been moved from the eject position into the holding tray 16, which is in the loading position. For the transport of the information disc 3 from the eject position into the loading position the left-hand transport element 14 and the right-hand transport element 15 have been provided.

Figure 7:
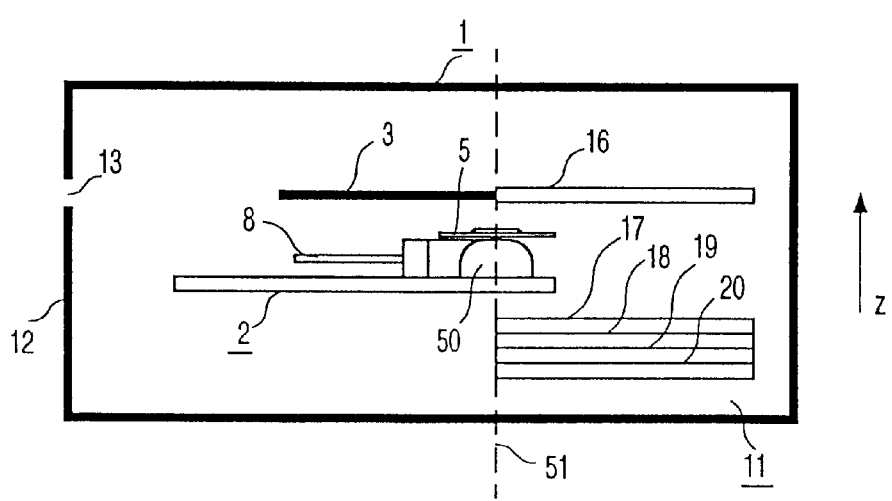
FIG. 7 is a side view of the changer apparatus, the read/write unit being in a play position.

FIG. 7 shows the changer apparatus 1 of FIG. 6, the read/write unit 2 being pivoted into the stacking unit 11. Pivoting about the pivotal axis 4 in FIG. 1 is effected by means of a drive mechanism, not shown. In FIG. 7 the center of the turntable 5 of the read/write unit is in centric alignment with the center of the information disc 3. The center of the turntable 5 and the center of the information disc 3 are situated on a stacking line 51 which extends in the vertical direction z. Information discs situated in one of the holding trays 16 to 20 can be moved in the vertical direction z along the stacking line 51 by means of the spindles 30 shown in FIG. 3.

Figure 8:
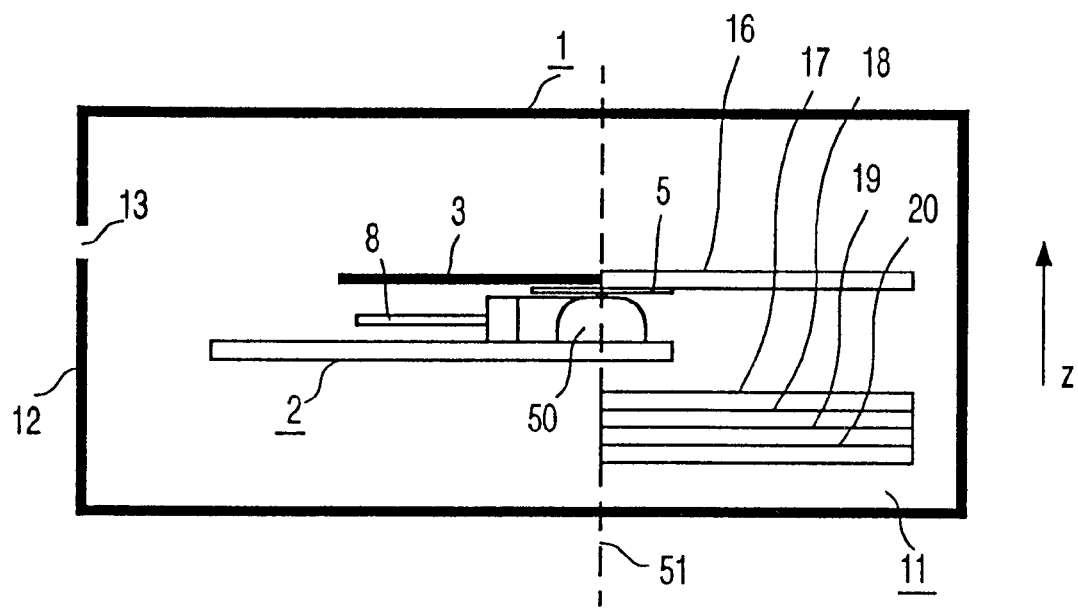
FIG. 8 is a side view of the changer apparatus, the information disc being pressed onto the turntable of the read/write unit by lowering of the holding tray carrying said disc.

FIG. 8 shows the changer apparatus 1 in a side view similar to that in FIG. 7 and shows the holding tray 16 with the information disc 3 after its has been moved towards the turntable 5 in the negative z direction along the stacking line 51 and has been clamped onto the turntable 5.

Figure 9:
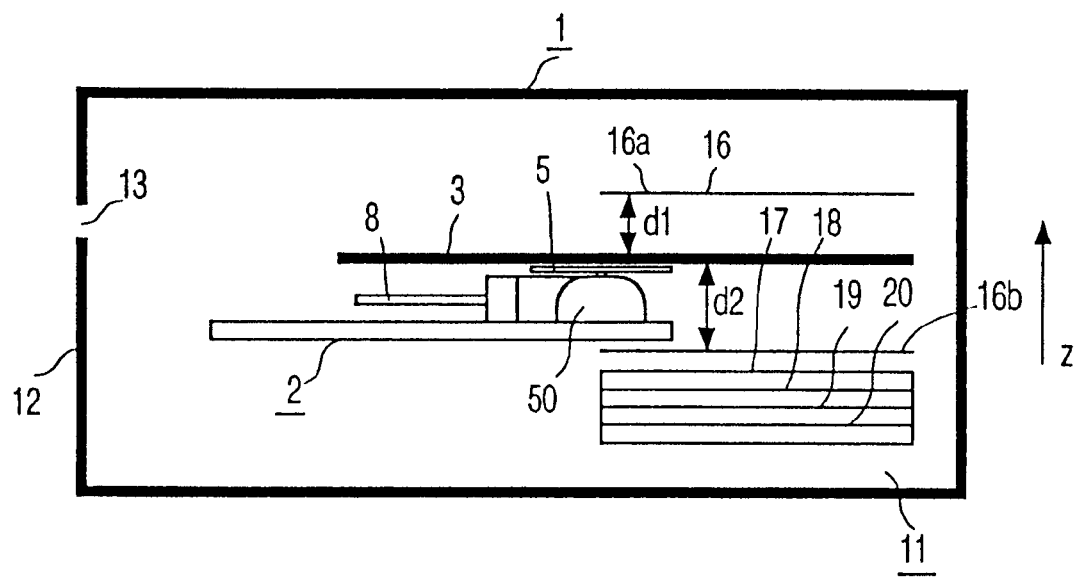
FIG. 9 is a side view of the changer apparatus, the information disc being disposed on the turntable of the read/write unit in the play position and the top part and the bottom part of the holding tray being moved away from the information disc on the turntable.

FIG. 9 shows the changer apparatus 1 in a play position, in which information stored on the information disc 3 can be read or information can be written onto the information disc 3 by means of the read/write unit 2. In FIG. 9 the top part 16a of the holding tray 16 is spaced from the information disc 3 by a distance $d_1$ in the positive z direction and the bottom part 16b of the holding tray 16 is spaced from the information disc 3 by the distance $d_2$. Starting from the situation in FIG. 8, this is achieved by a movement of the top part 16a in the positive z direction and by a movement of the bottom part 16b in the negative z direction, the information disc 3 remaining on the turntable 5 of the read/write unit 2. The distances $d_1$ and $d_2$ guarantee that the information stored on the information disc 3 can also be read correctly when the changer apparatus 1 is subjected to vibrations and the rotating information disc 3 cannot hit the top part 16a or the bottom part 16b. This is particularly advantageous for use of the changer apparatus 1 in motorcars, to guarantee that also in the case of vibrations which occur during operation the information disc 3 is played correctly.

FIG. 3 shows the spindles 30 together with the holding trays 16 to 20 in a situation corresponding to that in FIG. 8. The position of the holding tray 16 and the information disc 3 as shown in FIG. 8 corresponds to the vertical position P7 in FIG. 3.

Figure 4:
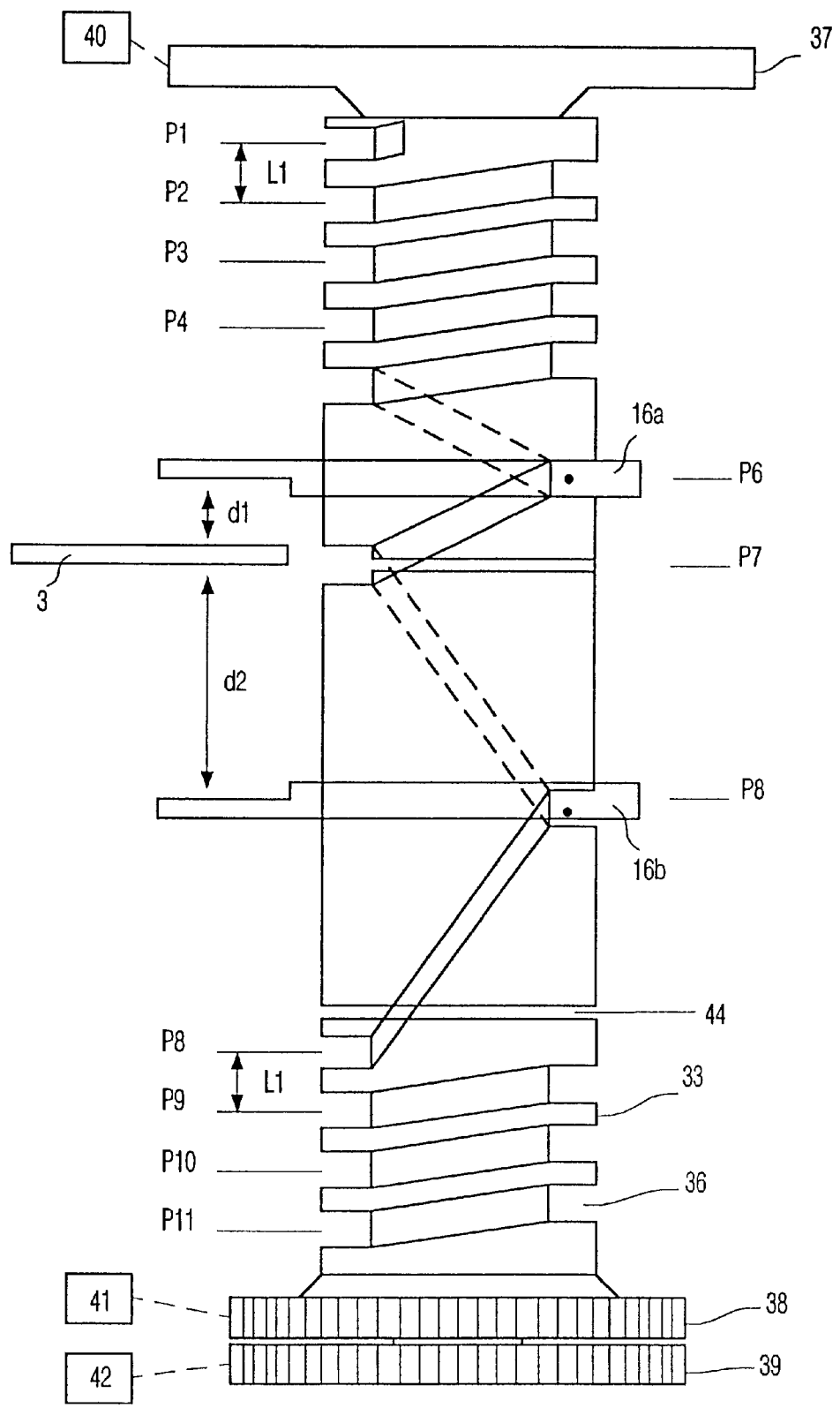
FIG. 4 is a side view of the spindle shown in FIG. 3, the top part and the bottom part of the holding tray carrying the information disc having been moved relative to one another by opposite rotation of the upper and the central spindle section, so that there is a clearance for the information disc.

FIG. 4 shows the spindles 30 and the top part 16a and the bottom part 16b of the holding tray 16 in a situation corresponding to that in FIG. 9. For reasons of clarity the holding trays 17 to 20 are not shown in FIG. 4.

FIG. 3 shows the holding tray 16 in the first separating plane 43. In this separating plane 43 the drive element 16c of the top part 16a of the holding tray 16 engages the first spindle section 31 and the drive element 16d of the bottom part 16b of the holding tray 16 engages the second spindle section 32. In order to obtain room for playing the information disc 3, starting from the position shown in FIG. 3, the first spindle section 31 and the second spindle section 32 are rotated in opposite directions, as a result of which the top part 16a is moved to the position P6 along the external screwthread 34 and the bottom part 16b is moved to the position P8 along the external screwthread 35. This is shown in FIG. 4. As a result of this, a distance $d_1$ is obtained between the information disc 3 and the top part 16a and a distance $d_2$ between the information disc 3 and the bottom part 16b.

Figure 10:
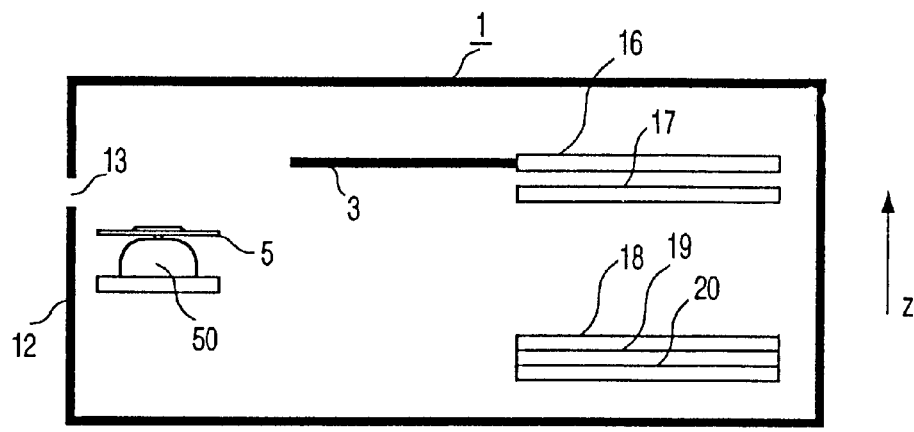
FIG. 10 is a side view of the changer apparatus, the read/write unit being in the standby position and a holding tray, which is in a stacking position, holding an information disc and a second holding tray being in the loading position.

In order to remove the information disc 3 from the play position shown in FIG. 4 after it has been played, the top part 16a and the bottom part 16b are returned to the position P7 shown in FIG. 3 by opposite rotations of the first spindle section 31 and the second spindle section 32. Starting from this position P7 the information disc 3 can be moved, for example, into the stacking position P1 by rotating the first spindle section 31 and the second spindle section 32 in the same direction. When the first spindle section 31 and the second spindle section 32 are rotated in the same direction the external screwthreads 35 and 34 form one continuous screwthread and the top part 16a and the bottom part 16b are also moved in the same direction towards the stacking position P1 in the positive z direction and guide the information disc 3. Preferably, the third spindle section 33 is then not rotated, so that the holding trays 17 to 20 remain in the positions shown in FIG. 3. FIG. 10 shows the holding tray 16 with the information disc 3 in the stacking position P5 as shown in FIG. 3. Starting from the situation shown in FIG. 3, the holding tray 16 has been moved from the position P7 shown in FIG. 3 into the position P5 by rotation of the first spindle section 31 and the second spindle section 32 in the same direction. The holding tray 17 is in the loading position P6 shown in FIG. 10. In order to move the holding tray 17 from the position P9 shown in FIG. 3 into the position P6 the third spindle section 33 is first rotated until the drive elements 17c and 17d of the holding tray 17 reach the area of engagement with the external screwthread 35 of the second spindle section 32. Subsequently, the rotation of the third spindle section 33 is preferably stopped and only the second spindle section 32 and the first spindle section 31 are rotated in the same direction so that the external screwthreads 35 and 34 form one continuous screwthread and the holding tray 17 is moved into the position P6, the drive elements 17c and 17d engaging in the external screwthreads 35 and 34.

Figure 11:
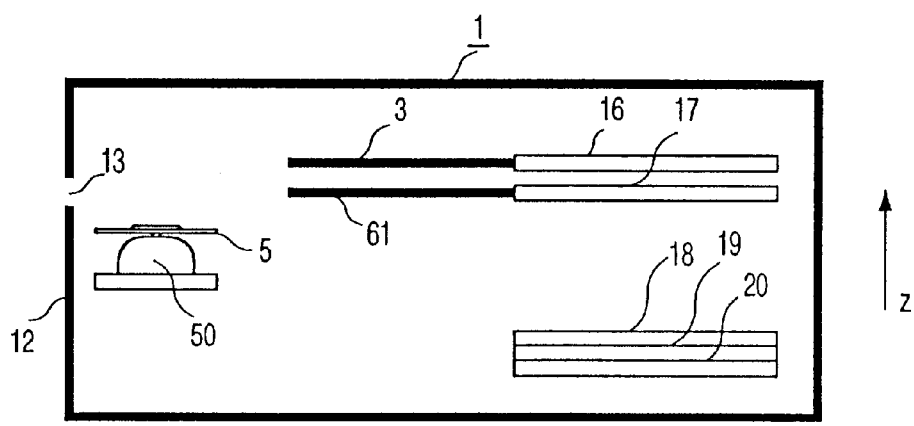
FIG. 11 shows the changer apparatus in a side view, a second information disc having been moved from the eject position into the holding tray which is in the loading position.

FIG. 11 shows the changer apparatus 1 of FIG. 10 in side view, after a second information disc 61 has been moved from the eject position into the holding tray 17 by means of the left-hand transport element 14 and the right-hand transport element 15 shown in FIG. 1.

Figure 12:
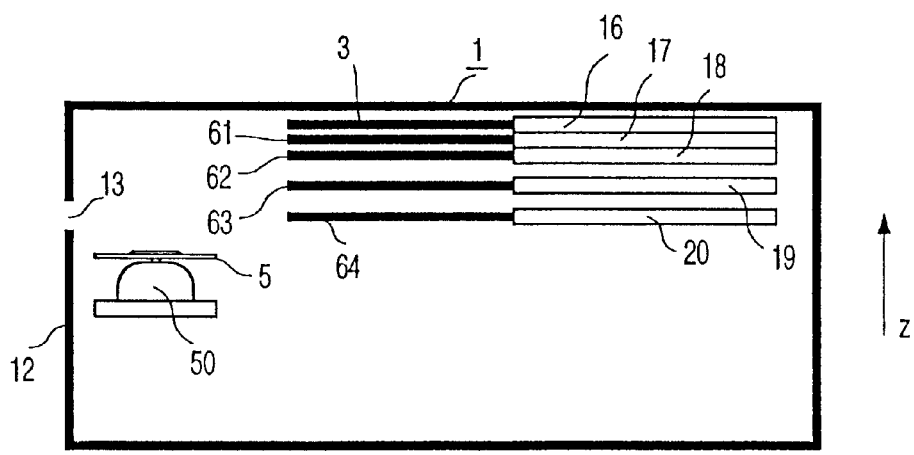
FIG. 12 is a side view of the changer apparatus, all five holding trays containing an information disc.

FIG. 12 finally shows the changer apparatus 1 with the holding trays 16 to 20, which are in the positions P2 to P6 in FIG. 3, the holding tray 16 holding the information disc 3, the holding tray 17 holding an information disc 61, the holding tray 18 holding an information disc 62, the holding tray 19 holding an information disc 63 and the holding tray 20 holding an information disc 64. Starting from the positions shown in this FIG. 12, the information disc 64 in the holding tray 20 can be moved into the play position P7.

What is claimed is:
1. A changer apparatus for information discs, including:
a disc read and/or write unit for reading information stored on an information disc and/or writing information onto the information disc; and
a stacking unit for stacking at least two information discs in at least two stacking positions, the stacking unit having:

holding trays for holding the information discs in holding planes, each holding tray having a top part and a bottom part, the top parts and the bottom parts are jointly movable in the same direction, and the top part and bottom part of at least one of the holding trays, when holding the information disc to be read and/or written, are movable with respect to each other; and first transport means for moving the holding trays among the stacking positions, and for jointly moving the top parts and the bottom parts of the holding trays in the same direction in order to transport the information disc inside the stacking unit; and for moving the top part and the bottom part of one of the holding trays, when holding the information disc to be read and/or written, with respect to each other in order to bring this information disc into a play position intended for reading and/or writing this information disc; and the first transport means moves the holding trays along a stacking line which is oriented transversly to the holding planes;

the apparatus has an eject position in which the information disc can be removed from the apparatus; and the apparatus includes second transport means for moving the information disc from a holding tray which is in a loading position of the stacking unit, into the eject position, the loading position being situated on the stacking line;

the eject position is laterally offset with respect to the stacking line; and the second transport means moves the information disc from the holding tray which is in the loading position, into the eject position.

2. A changer apparatus for information discs, including:

a disc read and/or write unit for reading information stored on an information disc and/or writing information onto the information disc; and a stacking unit for stacking at least two information discs in at least two stacking positions, the stacking unit having:

holding trays for holding the information discs in holding planes, each holding tray having a top part and a bottom part, the top parts and the bottom parts are jointly movable in the same direction, and the top part and bottom part of at least one of the holding trays, when holding the information disc to be read and/or written, are movable with respect to each other; and first transport means for moving the holding trays among the stacking positions, and for jointly moving the top parts and the bottom parts of the holding trays in the same direction in order to transport the information disc inside the stacking unit; and for moving the top part and the bottom part of one of the holding trays, when holding the information disc to be read and/or written, with respect to each other in order to bring this information disc into a play position intended for reading and/or writing this information disc; and the first transport means includes multiple spindles, each spindle having at least one screw thread and a separating plane which divides a first spindle section from a second spindle section, the first spindle section being coupled to the top part of the at least one of the holding trays and the second spindle section being coupled to the bottom part of the at least one of the holding trays to move the top part and the bottom part of the at least one parts of the holding trays by rotation of the spindles, the first spindle section and the second spindle section are rotatable in one common direction for moving the information discs inside the stacking unit, and the first spindle section and the second spindle section are rotatable with respect to one another for moving the information disc into the play position.

3. The apparatus of claim 2, in which the spindle (30) has a separating plane (43) which divides the first spindle section (31) and the second spindle section the holding tray is movable into the separating plane by rotation of the first spindle section and the second spindle section in the same direction in order to move the information disc into the play position, and the top part and the bottom part of the holding tray are movable relative to one another by rotation of the first spindle section and the second spindle section relative to one another.

4. The apparatus of claim 2, in which, for stacking the holding trays, the stacking unit has an upper and a lower stacking area, the loading position is situated in a central area between the upper and the lower stacking area, and one of the holding trays is movable into the loading position by rotation of the spindles.

5. A changer apparatus for information discs, including:

a disc read and/or write unit;

a disc stacking unit with at least two stacking positions, and including disc holding trays, each tray having a top part and a bottom part, the top parts and the bottom parts are jointly movable in the same direction; and the top part and the bottom part of one of the holding trays when holding an information disc to be read and/or written by the disc read and/or write unit, are movable with respect to each other in a play position; and a first disc transport mechanism connected to the top parts and the bottom parts of the trays to at times move the trays jointly in the same direction and at different times move the trays with respect to each other;

the holding trays are movable along a stacking line which is oriented transverse to planes of the holding trays and the first transport mechanism is arranged to move the trays along the stacking line;

the apparatus has an eject position in which the information disc can be removed from the apparatus;

the apparatus further includes a second transport mechanism positioned to move the information disc, from a holding tray which is a loading position of the stacking unit, into the eject position, the loading position being situated on the stacking line;

the eject position is laterally offset with respect to the stacking line; and the second transport mechanism is positioned to move the information disc, from the holding tray which is in the loading position, into the eject position.

6. A changer apparatus for information discs, including:

a disc read and/or write unit;

a disc stacking unit with at least two stacking positions, and including disc holding trays, each tray having a top part and a bottom part, the top parts and the bottom parts are jointly movable in the same direction; and the top part and the bottom part of one of the holding trays when holding an information disc to be read and/or written by the disc read and/or write unit, are movable with respect to each other in a play position; and a first disc transport mechanism connected to the top parts and the bottom parts of the trays to at times move the trays jointly in the same direction and at different times move the trays with respect to each other;

the first transport mechanism includes multiple spindles; each spindle has a separating plane which divides the spindle into a first spindle section and a second spindle section; the first spindle section is coupled to the top part and the second spindle section is coupled to the bottom part of the holding tray which holds the information disc; the first spindle section and the second spindle section are rotatable in one common direction; and the first spindle section and the second spindle section are rotatable with respect to one another.

7. The apparatus of claim 6, in which:

the holding tray holding the information disc is movable into the separating plane by rotation of the first spindle section and the second spindle section in the same direction, and the top part and the bottom part of the holding tray holding the information disc are movable relative to one another by rotation of the first spindle section and the second spindle section relative to one another.

8. The apparatus of claim 6, in which, for stacking the holding trays, the stacking unit has an upper and a lower stacking area, the loading position is situated in a central area between the upper and the lower stacking area, and one of the holding trays is movable into the loading position by rotation of the spindles.

* * * * *